(12) United States Patent
Karim et al.

(10) Patent No.: US 8,479,510 B2
(45) Date of Patent: Jul. 9, 2013

(54) EXHAUST GAS RECIRCULATION SYSTEM

(75) Inventors: Ahsanul Karim, Canton, MI (US);
Karen Elizabeth Maceroni, Casco, MI (US); Daniel Joseph Styles, Canton, MI (US); Keith Michael Plagens, Northville, MI (US); Keith D. Miazgowicz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 120 days.

(21) Appl. No.: 13/157,098

(22) Filed: Jun. 9, 2011

(65) Prior Publication Data
US 2011/0265473 A1 Nov. 3, 2011

(51) Int. Cl.
*F02B 33/44* (2006.01)
*F02M 25/07* (2006.01)
*F02M 35/10* (2006.01)
*F01N 5/04* (2006.01)

(52) U.S. Cl.
USPC .................. 60/605.2; 60/280; 123/568.17

(58) Field of Classification Search
USPC ..................... 60/605.2, 280; 123/568.17
IPC .................................. F02M 25/07,35/10
See application file for complete search history.

(56) References Cited

U.S. PATENT DOCUMENTS

| 4,237,847 | A |   | 12/1980 | Baugh et al. |
| 4,250,711 | A | * | 2/1981  | Zehnder .................. 60/605.2 |
| 5,533,487 | A | * | 7/1996  | Cailey .................... 60/605.2 |
| 6,138,651 | A |   | 10/2000 | Mori et al. |
| 6,267,106 | B1 |  | 7/2001  | Feucht |
| 6,272,851 | B1 |  | 8/2001  | Mori et al. |
| 6,470,682 | B2 | * | 10/2002 | Gray, Jr. ................. 60/605.2 |
| 6,502,397 | B1 |  | 1/2003  | Lundqvist |
| 6,742,335 | B2 | * | 6/2004  | Beck et al. .............. 60/605.2 |
| 6,776,146 | B1 |  | 8/2004  | Ricart-Ugaz et al. |
| 6,959,700 | B2 | * | 11/2005 | Wu et al. ................. 60/605.2 |
| 7,356,987 | B2 | * | 4/2008  | Kiser et al. ............... 60/280 |
| 7,801,669 | B2 |  | 9/2010  | Nagae |
| 8,235,685 | B2 | * | 8/2012  | Moran et al. ............ 60/605.2 |
| 8,307,646 | B2 | * | 11/2012 | Cattani et al. ........... 60/605.2 |
| 2010/0058758 | A1 | * | 3/2010 | Gilchrist et al. ........ 60/605.2 |

FOREIGN PATENT DOCUMENTS

| DE | 19756060 C1 * | 12/1998 |
| FR | 2893988 A1 * | 6/2007 |
| FR | 2926113 A1 * | 7/2009 |
| JP | 04112957 A * | 4/1992 |
| JP | 11210449 A * | 8/1999 |
| JP | 2006348781 A * | 12/2006 |
| JP | 2008075589 A * | 4/2008 |
| JP | 2012067609 A * | 4/2012 |
| WO | WO 2006122306 A2 * | 11/2006 |

* cited by examiner

*Primary Examiner* — Thai Ba Trieu
(74) *Attorney, Agent, or Firm* — Julia Voutyras; Alleman Hall McCoy Russell & Tuttle LLP

(57) ABSTRACT

An exhaust gas recirculation (EGR) system for a vehicle is provided. The EGR system includes a turbine fluidly coupled downstream of an exhaust manifold and an EGR conduit including a first port coupled to an exhaust passage directly downstream of the turbine, an axis of the first port arrange at a non-perpendicular angle with respect to the rotation axis of the turbine and a second port coupled to an intake system.

17 Claims, 5 Drawing Sheets

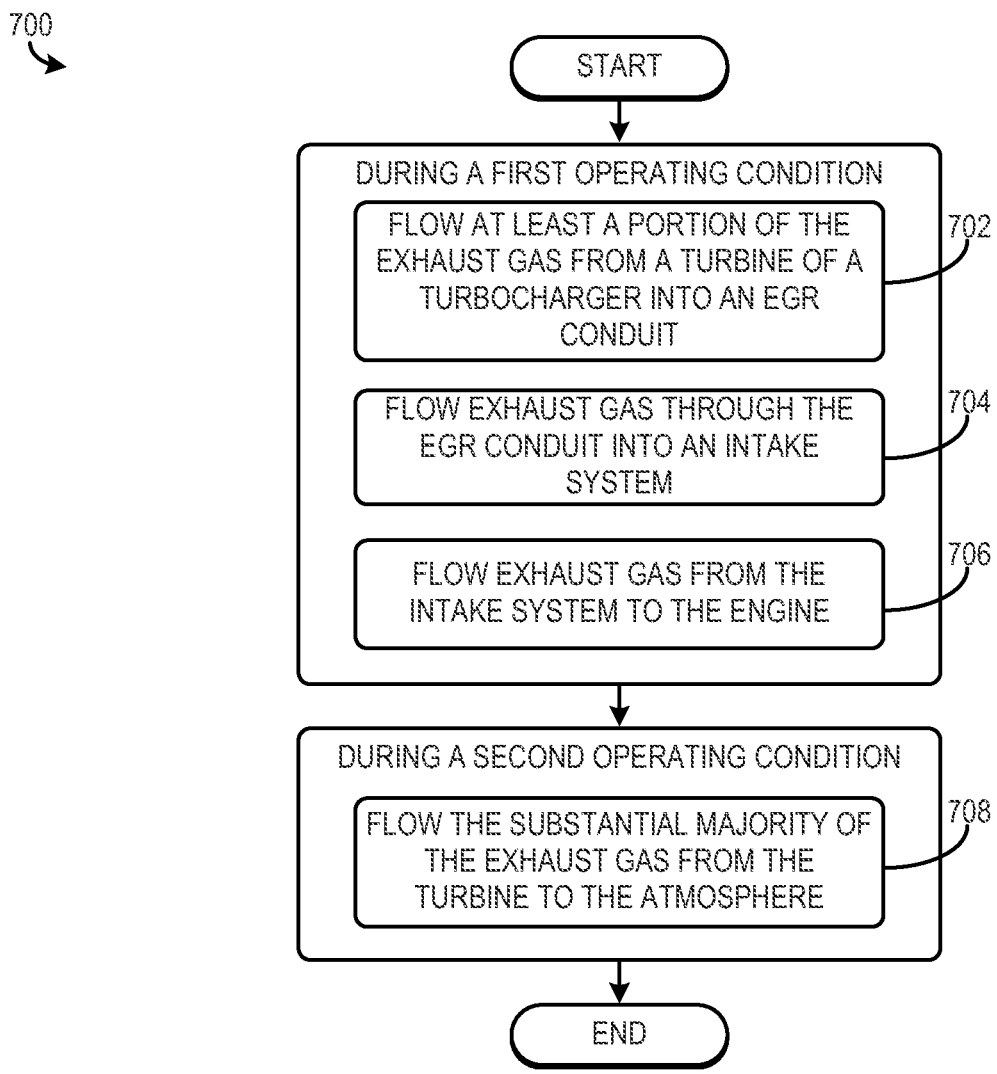

EXHAUST GAS RECIRCULATION SYSTEM

BACKGROUND/SUMMARY

Exhaust gas recirculation (EGR) may be used in internal combustion engines to decrease emissions, as well as improve combustion efficiency and fuel economy. Some EGR systems may draw exhaust gas from a location downstream of a turbine and flow the exhaust gas to the intake system. These types of EGR systems may be referred to as low pressure EGR systems.

U.S. Pat. No. 7,801,669 discloses an engine with a low pressure ERG loop. Specifically the EGR conduit is fluidly coupled to an exhaust conduit downstream of a turbine and a particulate filter. During selected operating conditions, exhaust gas may be directed through the EGR loop. By positioning the junction of the EGR conduit and the exhaust system downstream of the particulate filter, fouling of the EGR conduit may be reduced.

However, the Inventors have recognized several drawbacks with the EGR system disclosed in U.S. Pat. No. 7,801,669. The turbine and particulate filter may increase losses within the exhaust gas flowing through the exhaust system thereby decreasing the flowrate of exhaust gas traveling through the EGR conduit. Furthermore, losses within the EGR conduit may be large due the geometric configuration (e.g., T-Junction) of the confluence between the EGR conduit and the turbine outlet exhaust passage. Specifically, the tangential component of the gas flow may cause a large amount of flow separation and turbulence in the inlet to the EGR conduit. As a result the EGR system's efficiency may be decreased.

As such in one approach, an exhaust gas recirculation (EGR) system in a vehicle is provided. The EGR system includes a turbine fluidly coupled downstream of an exhaust manifold and an EGR conduit including a first port coupled to an exhaust passage directly downstream of the turbine, an axis of the first port arranged at a non-perpendicular angle with respect to the rotation axis of the turbine and a second port coupled to an intake system. In this way, the EGR conduit inlet may be integrated into the turbine housing, thereby decreasing losses and increasing EGR efficiency and therefore engine efficiency during selected operating conditions.

It has been discovered that when the EGR port is positioned in this way, the losses within the EGR system may be decreased. Specifically, the structural design (e.g., orientation of the EGR conduit) enables the tangential component of the exhaust flow exiting the turbine to drive flow through the EGR system to increase the volumetric flow of the exhaust gas through the EGR conduit.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE FIGURES

FIGS. 2-6 are drawn approximately to scale.

FIG. 7 shows a method for operation of an EGR system in a vehicle.

DETAILED DESCRIPTION

An exhaust gas recirculation (EGR) system having an increased efficiency is disclosed herein. The EGR system includes an EGR conduit having a first port positioned in a location in an exhaust system of a vehicle downstream of a turbine. The first port may be positioned at a non-perpendicular angle with respect to the rotational axis of the turbine. The rotational axis of the turbine is defined, in one example, by the rotational axis of the rotor assembly. In some embodiments, a central axis of the first port may be positioned at an angle between 0 and 90 degrees (e.g., 30 to 60 degrees) with respect to the rotational axis of the turbine. The angle may be selected to balance the axial and circumferential vector components of the flow field exiting the turbine to maximize the benefit of the EGR schedule. Further in some examples, the first port may be integrated into an outlet housing of the turbine enabling decreased losses in the EGR system to be achieved. In this way, exhaust gas may be efficiently directed through an EGR conduit during EGR operation. As a result, the efficiency of the EGR system may be increased.

Figure 1:
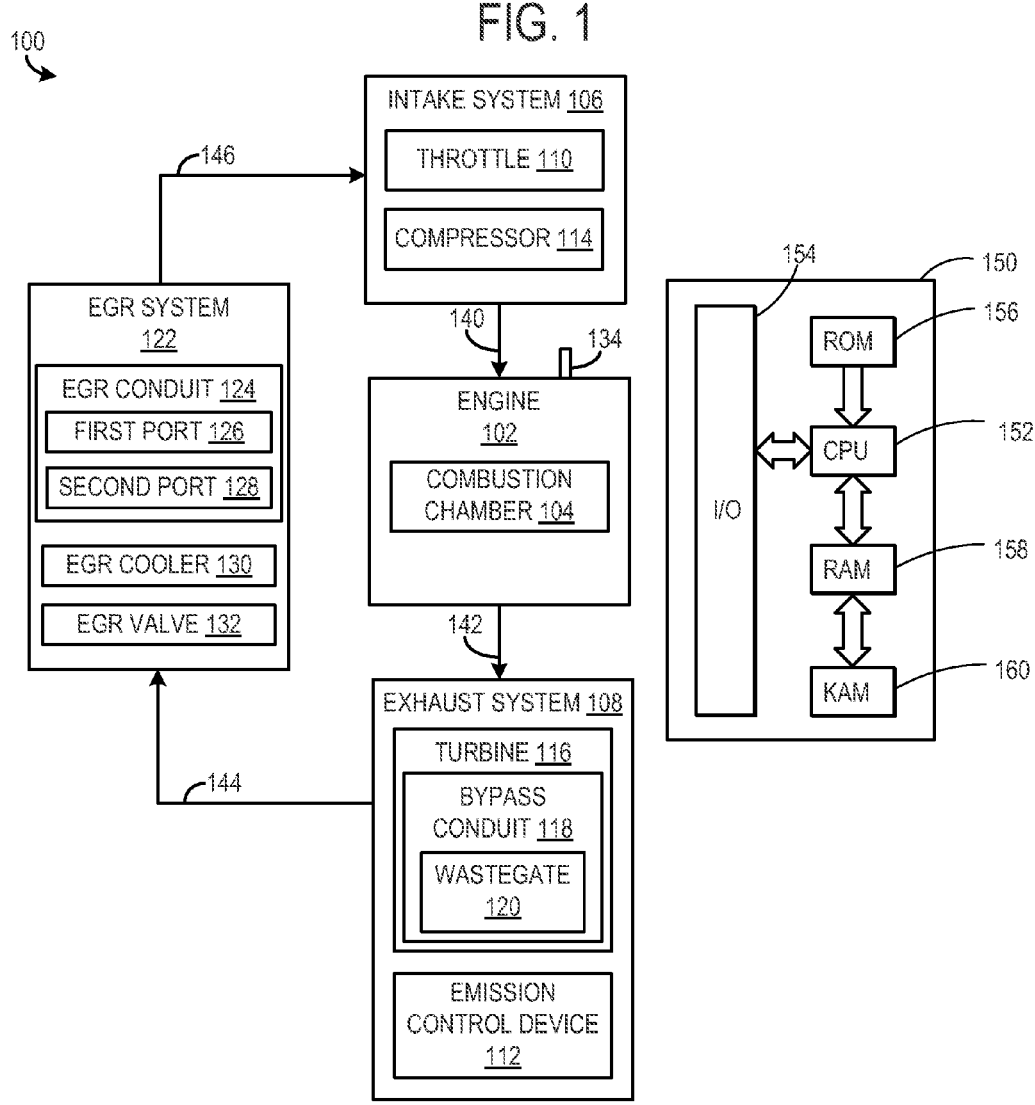
FIG. 1 shows a schematic depiction of a vehicle including an internal combustion engine, an intake system, an exhaust system, and an exhaust gas recirculation (EGR) system.

FIG. 1 shows a schematic depiction of a vehicle 100. It will be appreciated that the components included in vehicle 100 shown in FIG. 1 are schematically depicted. Illustrations of the components such as the EGR system are shown in FIGS. 2-6 and discussed in greater detail herein.

Vehicle 100 may include an engine 102 having at least one combustion chamber 104. The engine 102 may be configured to perform combustion in the combustion chamber 104. During operation, each combustion chamber within engine 102 typically undergoes a four stroke cycle: the cycle includes the intake stroke, compression stroke, expansion stroke, and exhaust stroke. Air is introduced into the combustion chamber during the intake stroke. During the compression stroke, a piston (not shown) is moved within the combustion chamber 104 to compress the air/fuel mixture. In a process hereinafter referred to as injection, fuel is introduced into the combustion chamber. However in other examples, fuel may be introduced into the combustion chamber 104 during the intake stroke in a process herein referred to as port injection. In a process hereinafter referred to as ignition, the injected fuel is ignited, such as via a spark plug or via compression ignition. During the expansion stroke, the expanding gases push the piston. A crankshaft (not shown) converts piston movement into a rotational torque of the rotary shaft. Finally, during the exhaust stroke, the combusted air-fuel mixture may be flowed to an exhaust manifold (not shown). Note that the above is shown merely as an example and other combustion operations may be performed in other embodiments.

The vehicle 100 includes an intake system 106 and an exhaust system 108 coupled to engine 102. The intake system 106 may provide intake gases to the engine and the exhaust system 108 may receive combustion exhaust from the engine 102. Arrow 140 depicts the flow of intake air into the engine 102 from the intake system 106 and arrow 142 depicts the flow of exhaust gas from the engine 102 to the exhaust system 108. The intake system may include various components such as an electronic throttle 110. The throttle is configured to alter the amount of intake air provided to engine 102.

The exhaust system 108 may include various components such as emission control device 112. It will be appreciated that emission control device 112 may be positioned downstream of turbine 116, discussed in greater detail herein. The emission control device may be a catalyst having one or more bricks, a particulate filter, etc. Further in some examples, two or more emission control devices may be utilized.

The intake system 106 may include a compressor 114. Likewise the exhaust system may include a turbine 116. The turbine and the compressor (114 and 116) may be included in a turbocharger. The turbocharger may be configured to selectively provide boost to the engine. In this way, the efficiency of the engine may be increased. It will be appreciated that a drive shaft or other suitable mechanical components may be provided in the turbocharger to enable rotational energy to be transferred from the turbine 116 to the compressor 114. The turbine 116 may include a bypass conduit 118 having a wastegate 120 positioned therein. Further in some embodiments the compressor 114 may include a bypass conduit (not shown) and a wastegate (not shown) positioned therein.

The vehicle may also include an EGR system 122 configured to flow exhaust gas from the exhaust system 108 to the intake system 106. Arrows 144 depict the flow of exhaust gas from the exhaust system 108 to the EGR system 122. Likewise arrow 146 depicts the flow of exhaust gas from the EGR system 122 to the intake system 106. The EGR system may include an EGR conduit 124, shown in greater detail in FIGS. 2-6. The EGR conduit 124 may include a first port 126 positioned in the exhaust system 108 downstream of the turbine 116 and a second port 128 position in the intake system 106. The first port 126 defines the confluence between the exhaust system 108 and the EGR system 122. Likewise the second port 128 defines the confluence between the intake system and the EGR system. The first port 126 may be positioned downstream of the turbine 116 in the exhaust system 108. The second port 128 may be positioned upstream of the compressor 114 in the intake system 106 in some embodiments. However, in other embodiments the second port 128 may be positioned downstream of the compressor 114. The EGR system may further include an EGR cooler 130 and/or an EGR valve 132, both of which may be positioned in the EGR conduit 124. The EGR cooler 130 may be configured to remove heat from the exhaust gas flowing through the EGR system 122 and the EGR valve 132 may be configured to regulate the amount of exhaust gas flowing through the EGR system 122. The EGR cooler 130 and the EGR valve 132 may both be adjusted via commands from controller 150, discussed in greater detail herein. In other embodiments the EGR system 122 may not include the EGR cooler 130.

The EGR conduit 124, and specifically the first port 126, may have various structural features that decrease losses in the EGR system 122, and which are described in more detail with regard to FIGS. 2-6. The structural features may include the angle at which the first port 126 and/or the EGR conduit 124 are arranged with respect to the rotational axis of the turbine 116. The structural features may also include the curvature of the EGR conduit 124. Additional features for reducing losses include the flush mounting of the first EGR port 126 with the exhaust system as well as the integration of the first port 126 into an outlet housing of the turbine 116. In one example, port 126 may be located just downstream of the turbine rotor 400 and upstream of the wastegate 120. Packaging constraints may preclude this design feature, resulting in port 126 being located downstream of wastegate 120. In both locations, the angle of port 126 may be selected to balance the axial and circumferential vector components of the flow field exiting the turbine to maximize the benefit of the EGR.

A temperature sensor 134 may be coupled to the engine 102. The temperature sensor may send signals to a controller 150. Controller 150 is shown in FIG. 1 as a conventional microcomputer including: microprocessor unit 152, input/output ports 154, read-only memory 156, random access memory 158, keep alive memory 160, and a conventional data bus.

Controller 150 may be used to operate various components in the vehicle 100 as well as receive signals from sensors in the vehicle. The components may include the engine 102, compressor 114, the turbine 116, the EGR cooler 130, and the EGR valve 132. However in other examples, additional or alternate controllers may be used to control operation of one or more of the aforementioned components.

A number of control strategies may be implemented to operate the aforementioned components. In one example, EGR valve 132 may be controlled via controller 150 and configured to alter the gas flow through the EGR conduit 124. Thus, during a first operating condition at least a portion of the exhaust gas in the exhaust system 108 may be directed through the EGR system 122 via commands from the controller 150. In this way, EGR operation may be performed to decrease emissions as well as increase combustion efficiency and fuel economy. Likewise during a second operating condition exhaust gas may be substantially inhibited from flowing through the EGR conduit 124 via command from controller 150. In this way, exhaust gas may be selectively flowed through the EGR system 122 based on the engine operating conditions. It will be appreciated that various operation conditions may alter the vehicle's need for EGR operation such as the engine temperature, requested torque, intake manifold air pressure, injection timing, valve timing, etc. Furthermore, it will be appreciated that during certain operating conditions such as when the exhaust gas has surpassed a threshold temperature the EGR cooler 130 may be operated to remove heat from the exhaust gas travelling through the EGR conduit 124. In this way, over-temperature conditions may not be experienced in the intake system 106.

Figure 2:
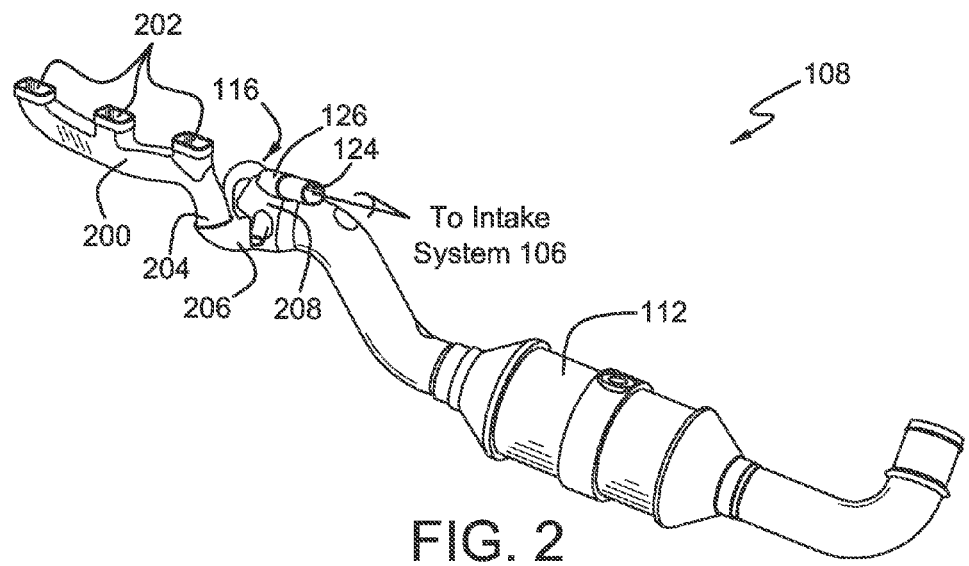
FIGS. 2-6 illustration various views of an example exhaust system and EGR system.

FIGS. 2-6 show various illustrations of the confluence of an EGR conduit and an exhaust conduit positioned directly downstream of a turbine. In other words, there are not any components (e.g., filters, catalysts, coolers, etc.,) positioned between the exhaust conduit and the turbine outlet. Specifically, FIG. 2 shows a perspective view of a portion of the exhaust system 108 as well as the EGR system 122. As shown, the exhaust system 108 includes an exhaust manifold 200 having branch conduits 202 that are fluidly coupled to at least one combustion chamber in the engine 102. The branch conduits 202 may converge at an exhaust collector 204. It will be appreciated that a variety of exhaust system configurations may be utilized and the depicted configuration is exemplary in nature.

The exhaust collector 204 may in turn be coupled to an inlet 206 of turbine 116. As shown the exhaust system further includes emission control device 112 positioned downstream of the turbine 116. Additionally the EGR conduit 124 is fluidly coupled to the exhaust system 108 at a location downstream of the turbine 116. Specifically in the depicted embodiment the confluence of the EGR conduit 124 and the exhaust system 108 is located in an outlet housing 208 of the turbine 116.

Figure 3:
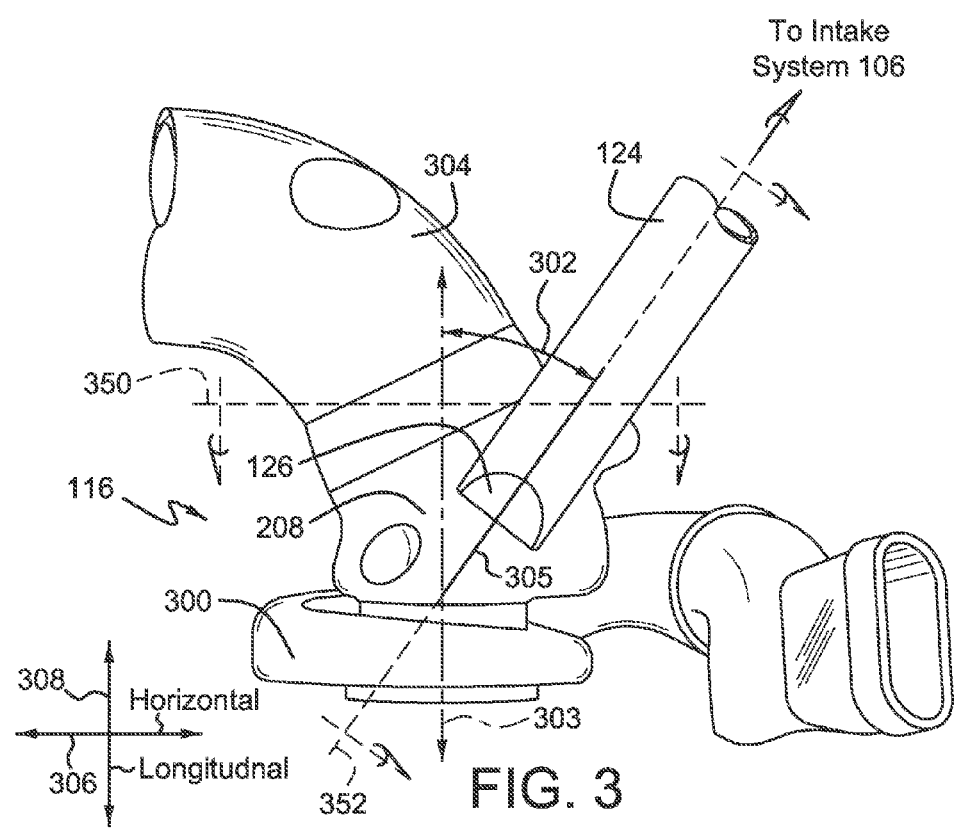

FIG. 3 shows a top view of the confluence of the first port 126 in the EGR conduit 124. Although the confluence between the first port 126 and the exhaust system 108 is located in the outlet housing 208 of the turbine 116 in the illustrated embodiment, it will be appreciated that in other embodiments the confluence may be located in another suitable location downstream of the turbine, such as in an exhaust conduit.

It will be appreciated that exhaust gas may be directed from the exhaust manifold into a turbine volute 300. The volute may be configured to direct exhaust gas to drive a rotor assembly 400, shown in FIG. 4. The rotor assembly 400 may in turn be rotatably coupled to a drive shaft (not shown) coupling the turbine 116 to the compressor 114. In this way, boost may be provided to the engine. After passing through the rotor assembly exhaust gas may be directed to a turbine outlet defined by outlet housing 208. The outlet housing 208 is fluidly coupled to an exhaust conduit 304. As shown, the exhaust conduit 304 extends outward and is curved with respect to the turbine rotational axis 303. However, in other examples alternate geometric configurations and orientations are possible.

As shown the angle 302 defined between the rotational axis 303 of the turbine 116 and the central axis 305 of the first port 126 is a non-perpendicular and non-straight angle. When the first port 126 and the exhaust conduit 124 are arranged in this way a greater amount of the tangential component of the exhaust flow exiting the rotor assembly 400 may be received via the EGR system during EGR operation. Specifically, the angle 302 may be between 0 and 90 degrees in the horizontal-longitudinal plane. Specifically in the depicted embodiment, the angle is approximately 50 degrees. However in other embodiments, alternate angles may be used. Angle 302 has a horizontal-longitudinal component and also a vertical-longitudinal component. The vertical coordinate axis is oriented into and out of the page in FIG. 3. Additionally the horizontal coordinate axis 306 is oriented across the page and the longitudinal coordinate axis 308 is oriented down the page. It will be appreciated that the longitudinal coordinate axis 308 is parallel to the rotational axis 303 of the turbine 116. The vertical-longitudinal component of angle 302 may be 0-90 (e.g., 30-60) and the horizontal-longitudinal component of angle 302 may be 0-90 (e.g., 30-60). The angles may be physically positioned to balance the axial and circumferential vector components of the flow field exiting the turbine to maximize the benefit of the EGR schedule.

The exhaust conduit 304 is fluidly coupled to the turbine outlet housing 208. Thus, the exhaust conduit is positioned downstream of the turbine outlet housing 208 and the first port 126. As shown the exhaust conduit 304 is curved with respect to the rotational axis 303 of the turbine. Specifically, in the depicted embodiment the exhaust conduit 304 is curved and extends away from the first port 126. This particular geometric configuration decreases losses in the EGR system 122 during EGR operation. However, in other embodiments alternate geometric configurations are possible to minimize the losses to reduce the effects of downstream backpressure. Additionally, the exhaust conduit 304 may be positioned vertically below the EGR conduit 124 in some embodiments.

It has been found through 3-dimensional flow analysis that when the EGR conduit 124 and the first port 126 are positioned in this way (e.g., angle 302 is between 40-60 degrees) the losses caused by the tangential component of the airflow may be decreased. Specifically, flow separation at the inlet of the EGR conduit 124 may be reduced, thereby increasing the efficiency of the EGR system and therefore the engine. It will be appreciated that the exhaust gas exiting the turbine 116 may have a higher tangential component than exhaust gases flowing through straight or curved sections of conduit due to the flow pattern generated via the rotor assembly of the turbine. The geometric features of the EGR conduit 124 enable a greater portion of the tangential component of the EGR gas to be transferred to the EGR conduit thereby increasing EGR system's efficiency. Line 350 defines the cross-section shown in FIG. 5. Additionally line 352 defines the cross section shown in FIG. 6.

Figure 4:
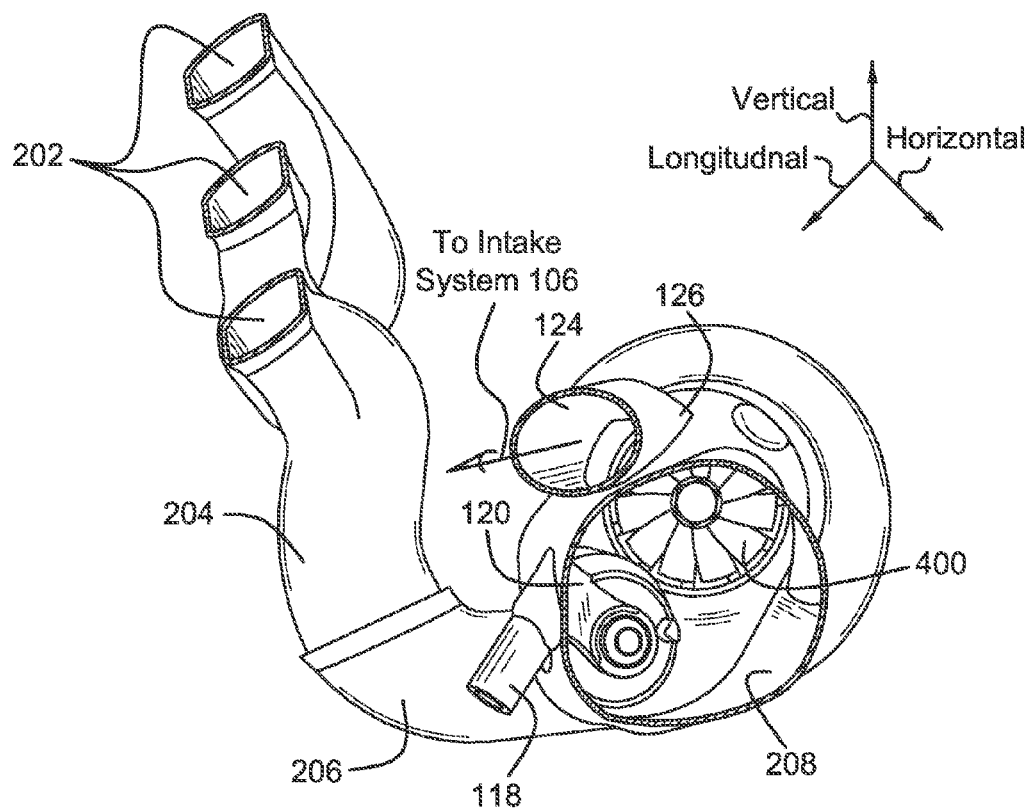

FIG. 4 shows a cross-sectional view of the turbine 116 and the EGR conduit 124. FIG. 4 show a rotor assembly 400 included in the turbine 116. Rotor assembly 400 may rotate in a clockwise or counterclockwise direction. As shown wastegate 120 may be positioned in the outlet housing 208. The wastegate may be configured to alter the amount of exhaust gas flowing through the turbine bypass conduit 118. In this way, the amount of boost provided to the engine 102 may be adjusted. However, in other embodiments the wastegate 120 may not be included in the exhaust system 108. As shown, the first port 126 may be positioned vertically above the wastegate 120 and/or the rotational axis of the rotor assembly 400. The vertical, horizontal, and longitudinal coordinate axes are provided for reference. The longitudinal axis may be aligned with the rotational axis of the turbine 116. However, it will be appreciated that the portion of the exhaust system 108 shown in FIG. 4 may be positioned in other orientations in other embodiments. Additionally, the diameter of the EGR conduit 124 is less than the diameter of the exhaust conduit 304, shown in FIGS. 2 and 3. Additionally, in the depicted embodiment, the turbine outlet housing 208 has a greater diameter than the exhaust conduit 304, shown in FIGS. 2 and 3. However, it will be appreciated that in other embodiments alternate geometric configurations are possible.

Figure 5:
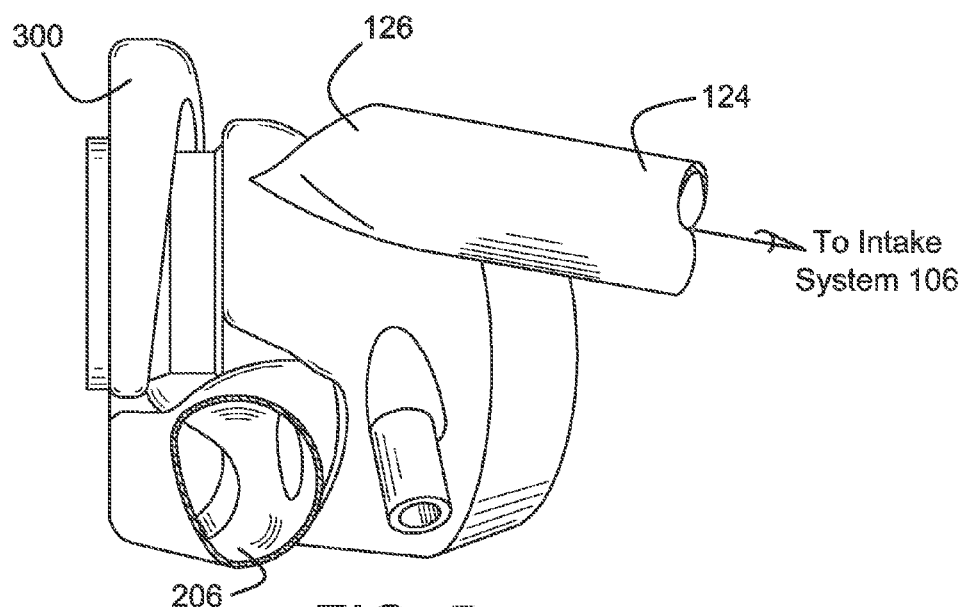

FIG. 5 shows another view of the turbine 116. As previously discussed, exhaust gas may be directed through the turbine inlet 206 to the volute 300. Additionally, the exhaust gas may be directed through the EGR conduit 126 during certain operating conditions.

Figure 6:
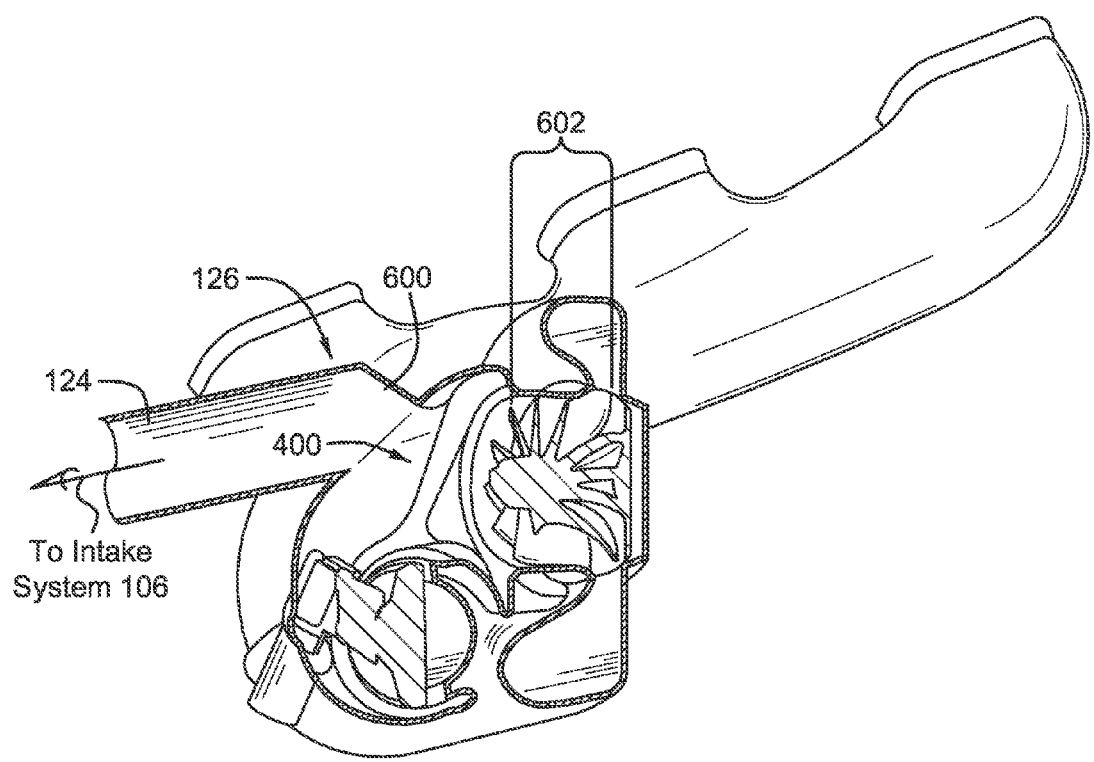

FIG. 6 shows a cross-sectional view of the turbine 116, the EGR conduit 124, and the first port 126. As shown, the first port 126 may be flush mounted. Flush mounting as described herein includes type of attachment between two conduits in which there is no overhang in the junction. In other words, the EGR conduit 124 does not extend into the turbine outlet housing 208. In this way, the flow separation in the EGR conduit may be reduced. Reduced flow separation may decrease losses within the EGR system thereby increasing the system's efficiency. Additionally in some embodiments the edges of the first port may be rounded to further decrease losses within the EGR conduit.

Additionally, the first port 126 includes a tapered portion 600. As shown the tapered portion tapers toward the rotor assembly 400. The tapering may decrease flow separation in the EGR conduit 124. However, in other embodiments the first port 126 may not include a tapered portion. For example, a cross-section of the EGR conduit 124 perpendicular to the axis of the conduit may be substantially symmetric (e.g., circular).

FIG. 6 further shows tapered portion 600 positioned adjacent to the outer edge 602 of rotor assembly 400. The positioning and geometric configuration of the tapered portion 600 enables a great amount of the tangential flow of the exhaust gas exiting the turbine 116 to travel into the EGR conduit 124, thereby reducing losses in the EGR system 122. Furthermore, the first port 126 is positioned proximate to the rotor assembly 400. Specifically, the first port is positioned downstream of the rotor assembly 400 and located in the turbocharger housing 208. Additionally, the first port 126 may be positioned downstream of the turbocharger housing 208 in the exhaust conduit 304 with regard to the rotational axis of the rotor assembly.

FIG. 7 shows a method 700 for operation of an EGR system in an internal combustion engine of a vehicle. FIG. 7 may be implemented by the systems, components, devices, etc., described above or alternatively may be implemented via other suitable systems, components, devices, etc.

Steps 702-707 are implemented during a first operating condition. At 702 the method includes flowing at least a portion of the exhaust gas from a turbine of a turbocharger into an EGR conduit. As previously discussed the EGR conduit may be arranged at a non-perpendicular angle with regard to the rotational axis of the turbine. At 704 the method further includes flowing exhaust gas through the EGR conduit into an intake system. Next at 706 the method includes flowing exhaust gas from the intake system to the engine. Step 708 is implemented during a second operating condition. At 708 the method includes flowing the substantial majority of the exhaust gas from the turbine to the atmosphere.

The position of the EGR conduit as well as other structural features of the EGR system disclosed above enable the losses within the EGR system to be reduced, enabling increased EGR efficiency to be achieved. As a result engine operation may be improved.

It will be appreciated that the configurations and/or approaches described herein are exemplary in nature, and that these specific embodiments or examples are not to be considered in a limiting sense, because numerous variations are possible. The subject matter of the present disclosure includes all novel and nonobvious combinations and subcombinations of the various features, functions, acts, and/or properties disclosed herein, as well as any and all equivalents thereof.

The invention claimed is:

1. An exhaust gas recirculation (EGR) system in a vehicle comprising:
   a turbine fluidly coupled downstream of an exhaust manifold; and
   an EGR conduit including: a first port coupled to a passage directly downstream of the turbine and positioned vertically above a wastegate outlet, the wastegate positioned within an outlet housing of the turbine, an axis of the first port arranged at a non-perpendicular angle with respect to a rotation axis of the turbine; and, a second port coupled to an intake system.

2. The EGR system of claim 1, wherein the passage is an outlet housing of the turbine.

3. The EGR system of claim 1, wherein the axis of the first port is arranged at an angle greater than zero but less than 90 degrees with respect to the rotation axis of the turbine.

4. The EGR system of claim 1, wherein the first port is flush mounted with the passage.

5. The EGR system of claim 1, further comprising an emission control device coupled to the passage.

6. The EGR system of claim 1, wherein the second port is coupled upstream of a compressor.

7. The EGR system of claim 1, further comprising an exhaust conduit coupled to an outlet housing of the turbine and an EGR conduit extending from the first port, wherein the exhaust conduit is curved.

8. The EGR system of claim 7, wherein the curvature of the exhaust conduit extends away from the EGR conduit.

9. The EGR system of claim 7, wherein the exhaust conduit is positioned vertically below the EGR conduit.

10. The EGR system of claim 7, wherein a diameter of the EGR conduit is less than a diameter of the exhaust conduit.

11. The EGR system of claim 7, wherein a diameter of the outlet housing of the turbine is greater than a diameter of the exhaust conduit.

12. The EGR system of claim 1, wherein the first port is positioned adjacent to a rotor assembly in the turbine.

13. An exhaust gas recirculation (EGR) system in a vehicle comprising:
    a turbine fluidly coupled downstream of an exhaust manifold; and
    an exhaust gas recirculation (EGR) conduit including a first port coupled to an exhaust passage directly downstream of the turbine, an axis of the first port arranged at a non-perpendicular angle with respect to a rotation axis of the turbine and a second port coupled to an intake system, the first port being flush mounted with the exhaust passage, the first port including an upper portion that is tapered.

14. The EGR system of claim 13, wherein the angle is between 0-90 degrees.

15. The EGR system of claim 13, wherein the first port is positioned vertically above a wastegate outlet.

16. The EGR system of claim 13, wherein the second port is coupled upstream of a compressor.

17. An exhaust gas recirculation (EGR) system in a vehicle, comprising:
    a turbine fluidly coupled downstream of an exhaust manifold; and
    an EGR conduit including: a first port coupled to a passage directly downstream of the turbine, an axis of the first port arranged at a non-perpendicular angle with respect to a rotation axis of the turbine; and, a second port coupled to an intake system; and
    an exhaust conduit coupled to an outlet housing of the turbine and an EGR conduit extending from the first port, wherein the exhaust conduit is curved.

* * * * *